United States Patent [19]
Daniels et al.

[11] Patent Number: 5,725,269
[45] Date of Patent: Mar. 10, 1998

[54] CONVEYOR BELT CLAMPING AND PULLING APPARATUS

[75] Inventors: William James Daniels, Orland Park; Gary Edward Mitas, Downers Grove, both of Ill.

[73] Assignee: Flexible Steel Lacing Company, Downers Grove, Ill.

[21] Appl. No.: 445,744

[22] Filed: May 22, 1995

Related U.S. Application Data

[63] Continuation-in-part of Ser. No. 61,162, May 13, 1993, Pat. No. 5,431,371.

[51] Int. Cl.$^6$ .................................................. B25B 25/00
[52] U.S. Cl. .................... 294/132; 294/103.1; 294/106; 254/199
[58] Field of Search ............................ 294/81.6–81.62, 294/101, 103.1, 104, 106, 113, 114, 116, 132–136; 24/132 R, 134 R, 134 L, 134 N, 136 R; 254/199, 218; 269/228, 238

[56] References Cited

U.S. PATENT DOCUMENTS

| | | | |
|---|---|---|---|
| 995,525 | 6/1911 | Cocker | 294/134 |
| 1,132,133 | 3/1915 | Urie | 294/134 |
| 1,219,395 | 3/1917 | Hascall | 294/132 |
| 3,955,810 | 5/1976 | Travis | 294/104 X |
| 4,340,206 | 7/1982 | McJunkin | 294/104 X |
| 4,462,626 | 7/1984 | Heidemann | 294/133 X |
| 4,681,359 | 7/1987 | Stolz | 294/132 X |

*Primary Examiner*—Johnny D. Cherry
*Attorney, Agent, or Firm*—Fitch, Even, Tabin & Flannery

[57] ABSTRACT

A portable belt clamping and pulling apparatus is provided to grip and pull belt ends together for splicing belt ends of a conveyor belt. A pair of belt ends are clamped between respective pairs of I-beams, the clamped belt ends are pulled together by a come-along mechanism, and the free ends of belt between the I-beams are maintained held together in a tension-free environment to allow fastening together of the belt ends. The preferred clamping jaws are in the form of at least one clamping lever pivotally mounted on a central frame having a central opening through which the I-beams are inserted. The clamping lever is connected to a pulling device that pivots the clamping lever to cause the clamping members to tightly grip a belt end between the I-beams. The clamping jaws include respective pre-tightening screws for clamping the I-beams to the belt prior to the initiation of pulling by the chains so as to eliminate slippage of the belt from between the I-beams during the initial pulling. The belt is gripped against slipping by being bent in a serpentine path between I-beam flanges of different width spans. Vertical guiding surfaces on frame walls defining the central opening are positioned adjacent respective forward and rear vertical surfaces of the I-beams to guide at least one of the I-beams for vertical translation and to limit torsional twisting and rotation of the I-beams. In one embodiment, one clamping member is supported on a stationary anvil on the frame while a piston is pushed against the other clamping member by a lever pivoted by the pulling device.

25 Claims, 9 Drawing Sheets

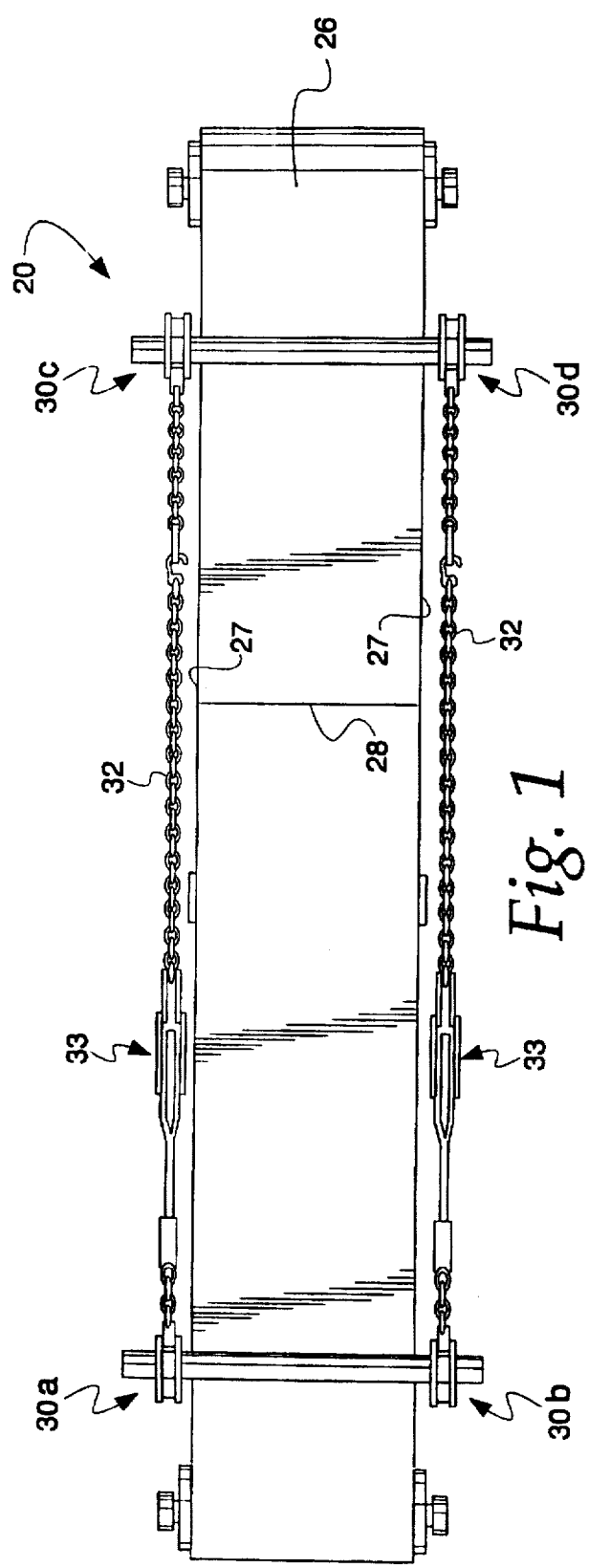
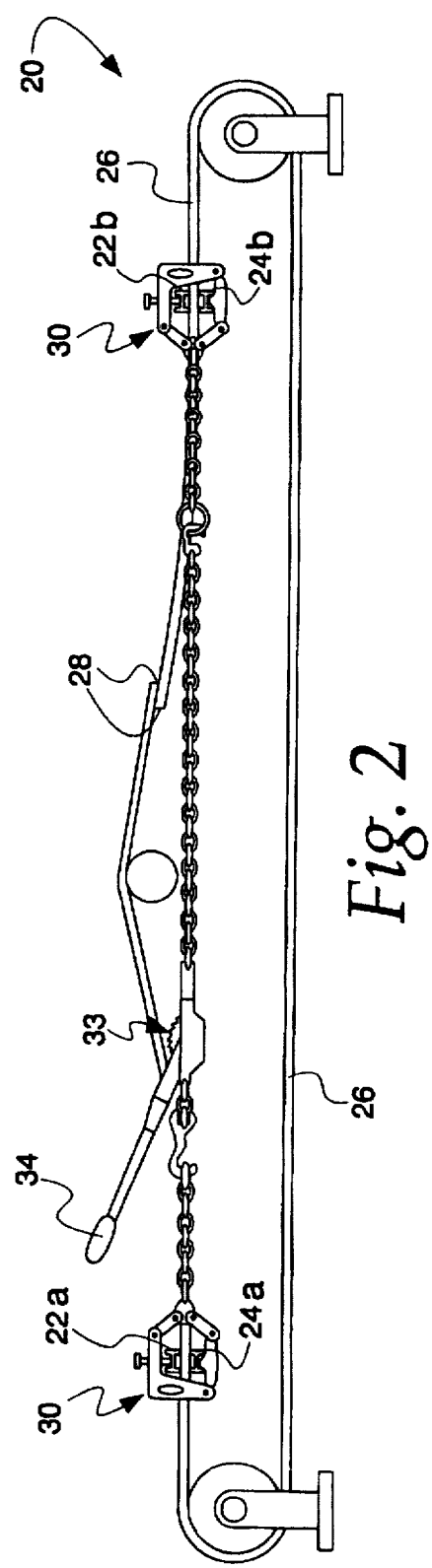

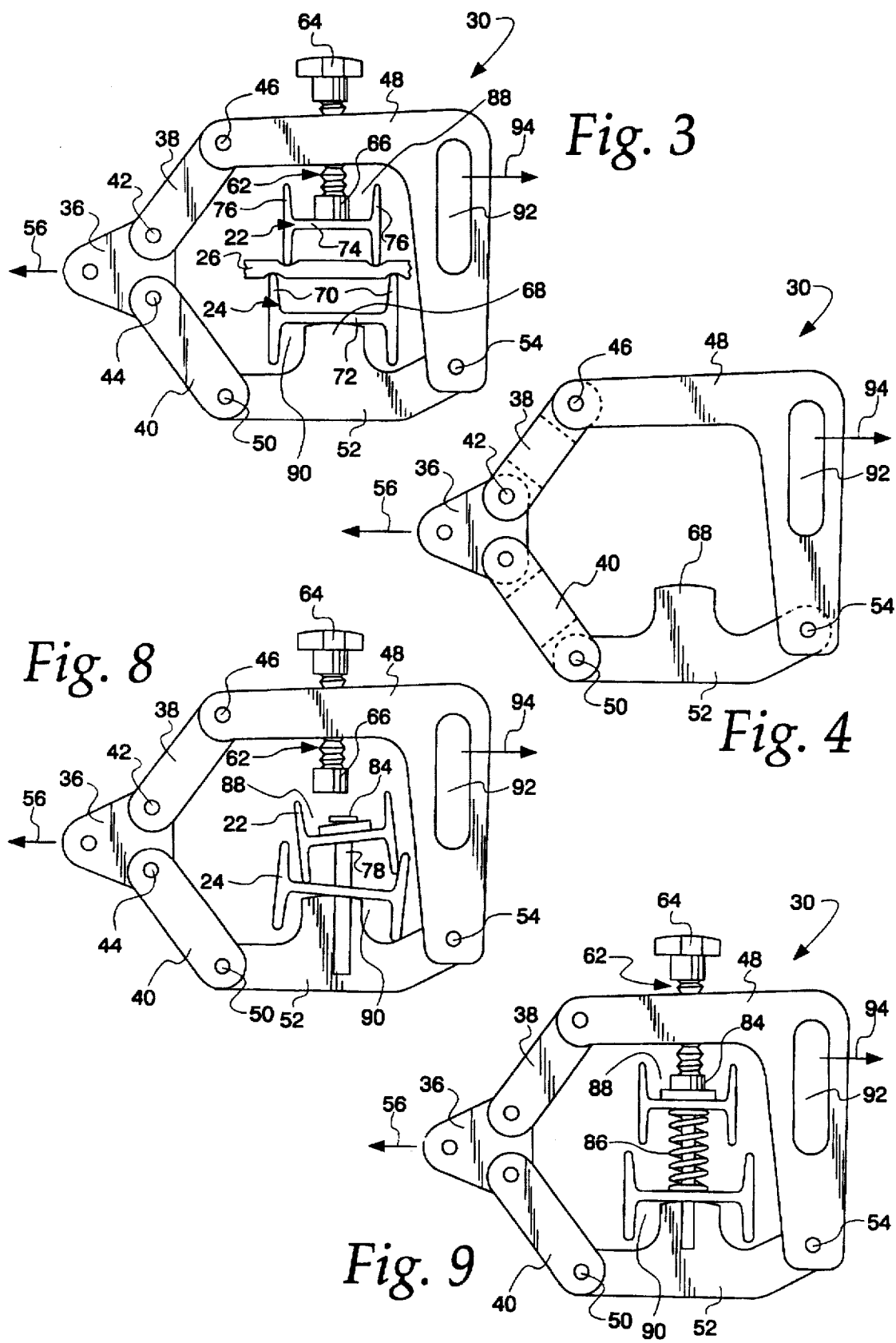

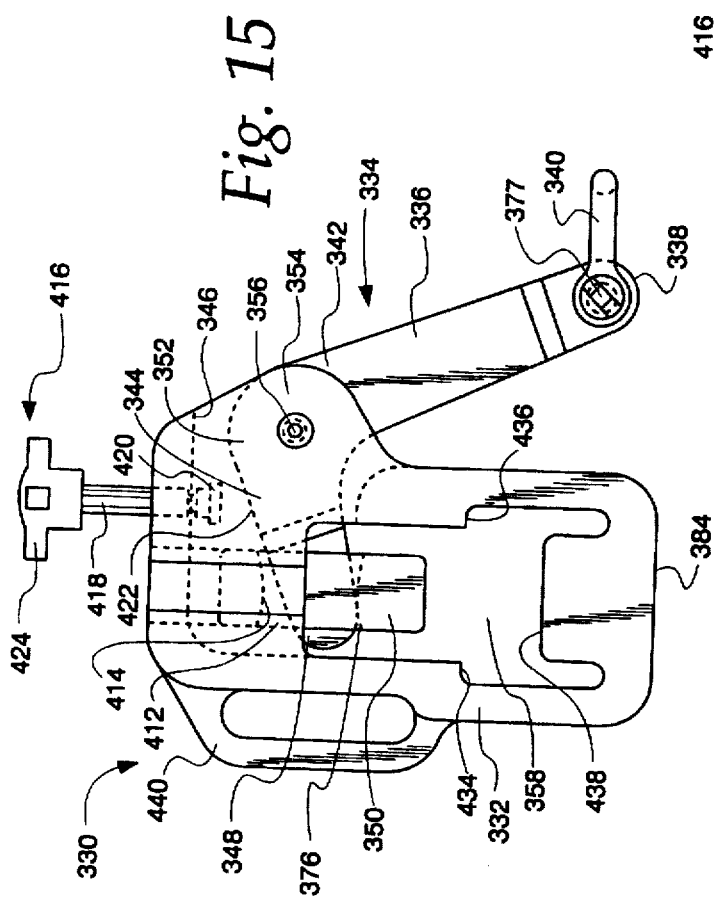

5,725,269

CONVEYOR BELT CLAMPING AND PULLING APPARATUS

RELATION TO OTHER APPLICATIONS

This application is a continuation-in-part of U.S. patent application Ser. No. 08/061,162 filed on May 13, 1993, now U.S. Pat. No. 5,431,371, which is hereby incorporated by reference.

FIELD OF THE INVENTION

The present invention pertains to a portable apparatus for gripping a pair of conveyor belt ends and pulling the belt ends together.

BACKGROUND OF THE INVENTION

During normal operation of a conveyor belt, the ends of the belt may be spliced together to form a continuous belt. The belt ends are connected together in such a manner that the continuous belt so formed is in tension throughout its length as it extends about rollers which define the continuous path of travel of the belt.

Conveyor belts have some elasticity, so that when pulled upon they stretch and become slightly elongated. The belts are tensioned about end rollers and in particular the drive rollers which engage and drive the endless belt. Upon rupture or tearing of the belt, the tension in the belt causes the portions of the belt on either side of the rupture to be pulled apart. Current methods and apparatus for re-connecting the belt ends at the point of belt rupture suffer numerous shortcomings. In order to splice the ends of the belt in the field, a portable belt gripping and tension device is brought to the location on the conveyor at which the rupture is located.

It is desirable to effect re-connecting of the belt ends together while the belt ends are flaccid, so that it is not necessary to deal with the forces tending to separate the belt ends from one another while attempting to connect the belt ends. Known portable belt clamping and stretching devices include a pair of clamping plates together on either side of the belt in proximity with both of the respective belt ends for clamping the belt ends, and pulling the clamped belt ends toward one another. This stretches the belt and places the belt into tension over its length except over the end portions of the belt which are situated between the clamps, which end portions are slacked or flaccid, thereby allowing a splicing of the belt ends to one another in a tension-free environment.

It is known to utilize clamping jaws which close together about the clamping members, to press the clamping members together, as the clamping jaws are pulled upon to pull the belt ends toward one another. In one embodiment of the invention, a pair of clamping levers are utilized in a clamping jaw. In this embodiment, a plurality of linkages can be required to transmit the pulling force to the clamping levers and ultimately to the clamping members.

In a preferred embodiment, a single clamp lever presses a clamp member associated therewith towards the other clamp member. The clamping force which the clamping lever or levers exert upon the clamping members is directly proportional to the pulling force pulling the belt ends toward one another. That is, upon pulling on the clamping jaws to pull the belt ends toward one another, the distance between the clamping members above and below the respective belt ends is reduced to a distance sufficient to clamp the belt therebetween. These arrangements have a few shortcomings, including those associated with slippage of the belt with respect to the clamping members, as discussed below. In addition, with single clamping lever arrangements, the single clamp lever driving the clamp member can tend to cause the clamp member to roll as the pulling force is applied to pull the clamped belt ends towards one another.

One cause of the undesirable slippage between the belt and the clamping members is due to the fact that upon initial pulling on the clamping jaws to pull the belt ends toward one another, the clamping jaws and their associated clamping members are pulled toward one another prior to the clamping members having attained a sufficient clamping force on the respective belt ends. That is, when the clamping jaws are initially pulled upon, they do not tightly clamp the clamping members to the belt. Hence, during the initial pulling, as the clamping members are just beginning to clamp down on the belt ends, the clamping jaws and their associated clamping members are being pulled toward one another. The clamping members thus slip or slide across the belt until they are closed together sufficiently by the clamping jaws to prevent further slippage of the belt from between the clamping members.

The initial slippage of the belt through the clamping members is undesirable since it precludes precise positioning of the clamping members at the belt ends, and such slippage may be a safety hazard. The initial slippage of the belt is also undesirable since this requires the operator to pull the belt ends further than he would otherwise have to in order to stretch the belt sufficiently. That is, chains or other pulling members interconnect the clamping jaws of opposite belt ends and shortening the length of the chains pulls the belt ends together. Thus, there is a need for a belt clamping apparatus which prevents initial slippage of the belt when the belt ends are initially pulled toward one another.

Another cause of slippage with current belt clamping and pulling apparatus is that the clamping members, which are currently used to press together on opposite sides of the belt to grip the belt, do not provide a good gripping of belts of various widths between the members. The clamping jaws which press the members together are positioned at the outer ends of the members to accommodate both narrow and wide belts between the spaced clamping jaws. Hence, for all but the widest belts, the clamping jaws are spaced outwardly from the sides of the belt. Thus, when the respective ends of the clamping members are pressed toward one another, the clamping members bow outwardly from their center. That is, since the clamping jaws are positioned outwardly of the sides of the belt, the clamping members deflect the ends of the clamping members toward each other and tend to raise or bow the central portions of the clamping members over a substantial, central portion of the belt. Accordingly, the sides of the belt are clamped with high clamping forces with the central portions of the clamping members receiving reduced clamping forces. There is a need for belt clamping members which provide a more uniform gripping of the belt across its width.

The maximum pulling forces exerted on the clamping jaws become quite large, in many instances. For instance, the pulling force can be as much as 10,000 to 12,000 lbs. These high forces tend to cock or turn askew the clamping members if they are loosely mounted for vertical movement in the clamping jaws. That is, the substantially directed vertical forces are applied to clamping members from the clamping jaws with force components that tend to concentrate the load at the forward edges of the clamping members; thereby tending to lift the rear portions of the clamping members from the belts, and concentrating the gripping load on the front portions of the gripping members. This redistributes the clamping member load, and concentrates the clamping load at the front portions of the clamping members. This problem can also be seen in the previously mentioned single clamp lever arrangement where the single clamp lever driving the clamp member may cause the driven clamp member to roll under high pulling forces. In the preferred embodiment of the invention, the clamping members are I-beams, and the belt is gripped by being bent into a depression between opposed front and rear pairs of I-beam flanges. When the rear flanges lift from the belt, then only the front flanges are left to grip the belt against slipping. This lifting of the rear flanges and concentration of the load at the front flanges of I-beams removes the curving of the belt. It is curving of the belt that provides the good grip of the belt because the belt does not want to rebend, as it must if the belt is to slide and travel past the pairs of flanges. If the rear flanges lift, the belt is not curved in the manner it is curved when the rear flanges are held down.

The preferred clamping members are aluminum I-beams to keep them lightweight for ease in transporting. With the gripping jaws being along opposite sides of the belt, the force applied to the I-beam gripping members is at two points, and this force application at two widely-spaced points warps the I-beams by bending them from their normally relaxed shape. This warping of the shape of the clamping members also interferes with the gripping of the belt at very high force loads.

SUMMARY OF THE INVENTION

In accordance with the present invention, a conveyor belt clamping and pulling mechanism is provided which overcomes the aforementioned problems of the prior art. In the preferred and illustrated embodiment, this is achieved by a mechanism comprising a frame having an opening therein for receiving first and second clamping members for clamping a belt end therebetween. A piston is mounted to the frame for vertical movement relative thereto and a clamping lever is pivotally mounted on the frame for exerting a force on the piston to vertically move the piston into engagement with one of the clamping members. An anvil surface on the frame supports the other clamping member. Pulling means exerts a force on the clamping lever to pivot the clamping lever and exert a force on the piston, causing the first and second clamping members to tightly grip the belt end therebetween.

To substantially obviate the problem of cocking of the clamping members under high load pulling forces, substantially vertical guiding surfaces are provided to guide sides of the clamping members vertically to limit their tendency to cock and twist and thereby diminish their grip on the belt. The preferred clamping members are I-beams and it is preferred to guide both side flanges of the I-beams in their vertical travel and thereby limit the twisting and cocking. In the preferred embodiment of the invention, the belt clamping mechanism has a frame with an opening through which the I-beams project with vertical sides of the opening sized to the I-beams to allow them to travel vertically but not to rotate. This is achieved by providing substantially vertical guiding surfaces on a frame associated with the first and second clamping members on opposite sides of the belt which substantially eliminate any cocking or twisting of the clamping members that would diminish their grip on the belt. While these vertical surfaces may be applied to any of the embodiments of the inventions disclosed herein, the vertical surfaces are only illustrated in connection with the embodiments having a frame and one or more clamping levers associated with the frame.

The preferred vertical guide surfaces also restrain the clamping members from warping out of shape. That is, the side edges of the I-beam clamping members are abutted by long stationary guiding surfaces on the clamping jaws that preclude the I-beam flanges from twisting from their I-shape. This assists in retaining the good grip by forcing the belt to travel in a curved path if it is to slide between the opposed forward and rearward sets of I-beam flanges.

The preferred clamping jaws are formed with a frame body having a large central aperture through which the I-beams project, the vertical guide surfaces being defined by portions of the vertical walls of the frame body. The pulling linkage includes at least one lever pivotally mounted on the frame body. The preferred pre-tightening means comprises a force actuator mounted on the frame body for forcing the I-beams to grip the belt with an initially low gripping force. This initial pretightening is preferably accomplished by an adjustable tightening screw that causes the force-applying levers to push the I-beams to grip the belt. This limits the initial sliding of the I-beams along the belt, as the pulling linkage takes up the slack and becomes taut. After taking out the slack, a greater force is applied to the gripping levers.

The frame body is preferably lightweight for example, an aluminum metal body, and has a hand grip portion thereon to assist in sliding the clamping jaw closed to a side of the belt and also for carrying the clamping jaw to and from a belt location.

BRIEF DESCRIPTION OF THE DRAWINGS

In the drawings, wherein like elements are referenced alike:

FIG. 1 is a plan view of a belt clamping and pulling apparatus embodying various features of the present invention, attached to a conveyor belt;

FIG. 2 is a side elevational view of the clamping and pulling apparatus of FIG. 1;

FIG. 3 is a side elevational view of a belt clamping jaw and clamping beams of the belt clamping and pulling apparatus of FIG. 1;

FIG. 4 is a side elevational view of the belt clamping jaw of FIG. 1;

FIG. 8 is a side elevational view of the belt clamping jaw and belt pulling apparatus of FIG. 3, with an alignment pin extending between the beams;

FIG. 9 is a side elevational view of the belt clamping jaw and belt pulling apparatus of FIG. 8, shown with a biasing spring maintaining separation of the upper and lower beams;

FIG. 15 is a side elevational view of another preferred embodiment of a belt clamping and pulling apparatus embodying various features of the present invention, showing a single clamping lever engaging a piston mounted for vertical movement relative to a frame;

FIG. 16 is a front elevational view of a pair of frames as shown in FIG. 15 including a pair of clamping members extending through the frames;

FIG. 17 is a side elevational view of a frame as seen in FIG. 16 with the belt removed.

DETAILED DESCRIPTION OF THE PREFERRED EMBODIMENTS

Figure 5:
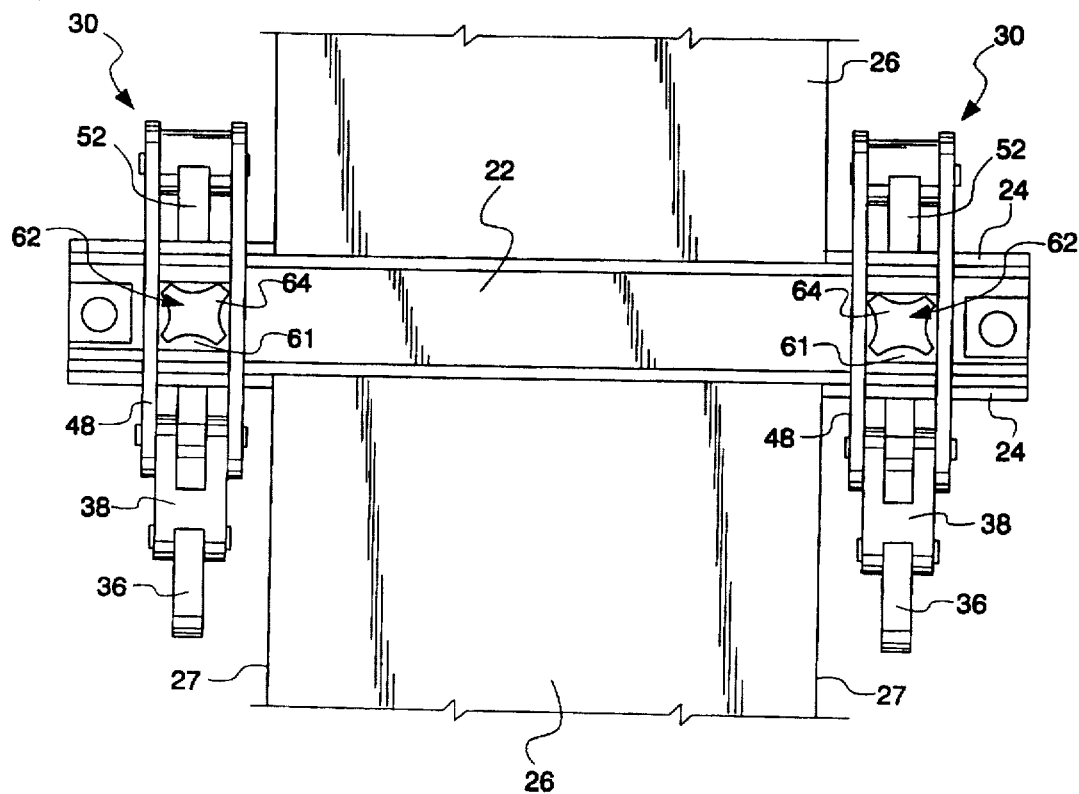
FIG. 5 is an enlarged plan view of the belt gripping and pulling apparatus of FIG. 1.
Figure 6:
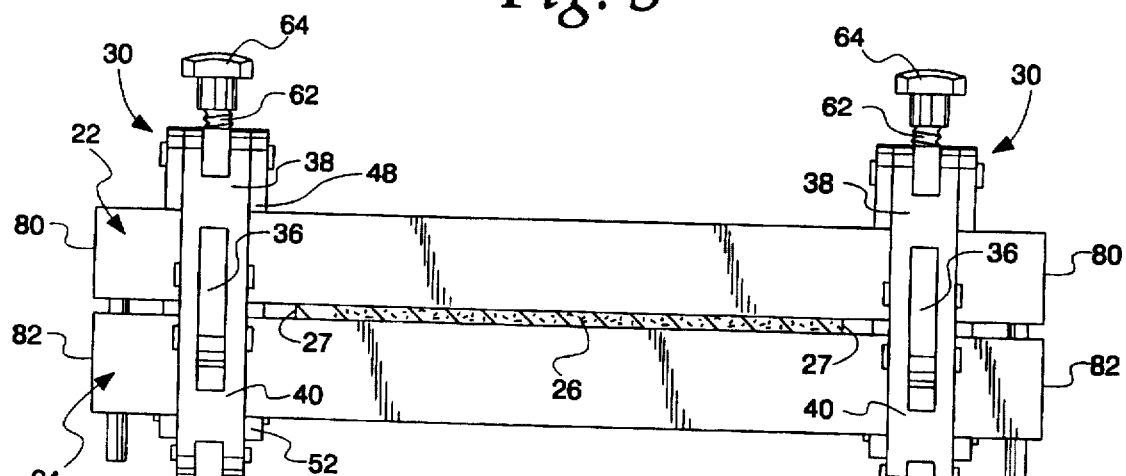
FIG. 6 is a front elevational view of the belt gripping and pulling apparatus shown in FIG. 5.

A belt clamping and pulling apparatus embodying various features of the present invention is illustrated in FIGS. 1–3, 5–6, and 8–11, and referred to generally by reference numeral 20.

With initial reference to FIGS. 1 and 2, the apparatus 20 comprises a first pair of upper and lower clamping members or beams, 22a and 24a, and a second pair of upper and lower clamping beams, 22b and 24b, which beam pairs clamp together about respective portions of a conveyor belt 26 in proximity with respective ends 28 of the conveyor belt 26 to allow pulling together of the belt ends by pulling members for fastening the belt ends together.

A first pair of clamping jaws 30a and 30b press together the first pair of upper and lower beams 22a and 24a, and a second pair of clamping jaws 30c and 30d press together the second pair of upper and lower beams 22b and 24b, into clamping engagement with respective end portions of the conveyor belt 26. The clamping jaws 30a and 30b associated with the first pair of clamping beams 22a and 24a are connected to respective clamping jaws 30c of and 30d the second pair of clamping beams 22b and 24b through pulling members such as variable length chains 32. The chains 32 each have a come-along mechanism 33, or other length varying mechanism, which operates upon advancement of the length-adjusting handles 34 thereof to shorten the length of the chains 32. Shortening of the chains 32 pulls the clamping jaws 30 toward one another to pull the clamped belt portions toward one another. Typically, such devices have a ratchet device therein which is turned by operation of the ratchet lever handle 34. Various tension devices may be used for exerting tension forces to pull the clamping jaws toward each other and to tension the belt.

The chains 32 pulling on the clamping jaws 30 also further tighten the clamping beams 22 and 24 onto respective portions of the belt 26, as discussed below. That is, pulling on the clamping jaws 30 effects movement of the I-beams 22 and 24 engaged by the clamping jaws being pulled upon from an open or release position in which the belt is loosely slidable between the I-beams, to a clamping position in which the I-beams 22 and 24 clamp the belt portion therebetween.

More specifically, in the illustrated embodiment shown in FIGS. 3, 4, 8, and 9, the clamping jaws 30 each comprise a linkage arrangement having a pulling link 36, with upper and lower intermediate links 38 and 40 pivotally connected near one of their respective ends, at pivot pins 42 and 44, respectively, to the pulling link 36. The upper intermediate link 38 is pivotally connected at pivot pin 46, near its other end, to an L-shaped upper clamping link 48; and the lower intermediate link 40 is pivotally connected at pivot pin 50, near its other end, to a lower clamping link 52. The upper and lower clamping links 48 and 52 are pivotally connected to one another at pivotal connection 54.

Pulling on the pulling link 36 in the direction of arrow 56 effects pulling down on the upper clamping link 48 at end 46, together with pulling upward on the lower clamping link 52 at end 50, whereby the upper and lower clamping links move toward one another. Thus, initially the respective upper and lower I-beams 22 and 24 are spaced from one another as shown in FIG. 9, but when the pulling links 36 of the clamping jaws 30 are pulled upon in the direction of arrow 56, the clamping jaws 30 move the I-beams from the spaced, open position toward a clamping position (FIG. 3) in which the I-beams clamp the belt. FIG. 4 shows the linkage arrangement of the clamping jaws 30 without the clamping beams 22, for clarity.

As discussed above, in the prior art there were problems realized due to slippage of the belt 26 from between the respective I-beams 22 and 24 upon initial pulling on the clamping jaws and/or clamping members. To eliminate this initial slippage problem, the upper clamping link 48 includes a flange 61 at its upper, horizontal end having a threaded aperture therethrough. (see FIG. 5) A tightening screw 62 is threaded in the threaded aperture and extends into the region between the upper and lower clamping links 48 and 52. The tightening screw 62 is advanced downwardly, further into the region between the upper and lower clamping links 48 and 52, upon clockwise rotation of the tightening screw 62. The tightening screw 62 has an integral head 64 at the upper end of the screw 62 which extends above the upper clamping link 48, to facilitate manual gripping of the screw 62. The screw 62 also has an integral, flat bearing portion 66 at the lower end of the screw 62 which extends into the region between the upper and lower clamping links 48 and 52.

With reference to FIG. 3, the lower clamping link 52 of each of the clamping jaws 30 includes an integral, raised bearing surface portion 68 upon which the respective, lower I-beam 24 is supported. That is, the lower I-beam 24 is supported near one of its ends by the bearing surface portion 68 of a first clamping jaw 30, and supported near its other end by the bearing surface portion 68 of a second clamping jaw 30. The bearing surface portions 68 of the respective clamping jaws 30 are preferably slightly arcuate and sufficiently narrow that the bearing surface portions 68 fit easily between the opposite vertical flanges 70 of the lower I-beam 24. Hence, the horizontal portion 72 of the lower I-beam 24 rests on the arcuate bearing surfaces 68 of a pair of clamping jaws 30, with the vertical flanges 70 of the lower I-beam 24 preventing the lower I-beam 24 from sliding off of the bearing surface portion 68. The I-beams 22 and 24 are preferably formed of aluminum to minimize the overall weight of the apparatus.

As seen in FIG. 3, the lower I-beam 24 resides on the underside of the belt 26, with the upper I-beam 22 residing on the upper side of the belt. The bearing portion 66 of the tightening screw 62 bears against the horizontal portion 74 of the upper I-beam 22. Accordingly, upon tightening of the screw 62, the bearing surface 66 of the screw 62 bears against the horizontal portion 74 of the upper I-beam 22 and urges the upper I-beam 22 downwardly in the direction of the lower I-beam 24.

Accordingly, by pre-tightening the clamping jaws 30 about the I-beams 22 and 24, by tightening the tightening screws 62 sufficiently, prior to pulling on the pulling link 36 to draw the belt ends 28 together, the aforementioned problem of slippage of the belt 26 from between the upper and lower I-beams 22 and 24 upon initial pulling may be significantly reduced or prevented.

That is, sufficient tightening of the tightening screw 62 effects clamping of the belt 26 between the upper and lower I-beams 22 and 24 even prior to pulling on the pulling links 36. Thus, upon subsequent pulling on the pulling links 36 to draw the belt ends 28 together, the upper and lower I-beams 22 and 24 will be sufficiently clamped about the belt 26 that the belt 26 will not slip during the initial pulling on the pulling members 36 to draw the belt ends 28 together. That is, previously the clamping jaws 30 only closed sufficiently together to effect clamping of the belt 26 therebetween after the pulling link 36 was pulled upon. Since the clamping jaws 30 would not have closed sufficiently to clamp the belt 26 during the initial pulling, there would be slippage of the belt 26 during the interval between the initiation of pulling and the subsequent closing together of the upper and lower clamping links. The tightening screw 64 allows for clamping of the belt 26 prior to the initiation of pulling on the clamping jaws 30, which pre-tightening or clamping eliminates belt slippage upon the initial pulling.

Figure 10:
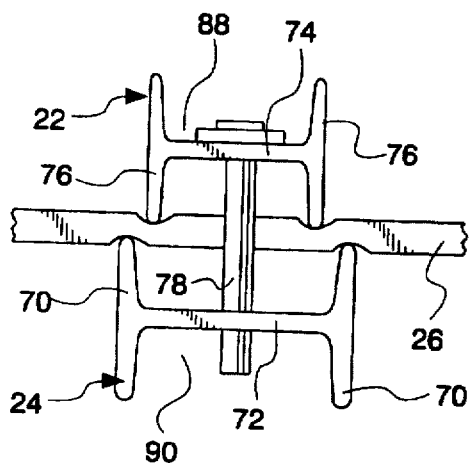
FIG. 10 is an enlarged side elevational view of a pair of I-beams in clamping engagement with a belt section.

As seen in FIG. 3, and particularly in FIG. 10, the I-beams 22 and 24 pinch the belt 26 and also distort the belt 26 into a serpentine configuration, when they clamp the belt. This pinching and curving of the belt 26 provides improved gripping of the belt 26 over conventional flat clamping members.

The upper and lower I-beams 22 and 24 are preferably aligned and preferably have different spans, so that the vertical flanges 70 of the lower I-beam 24 are offset from the vertical flanges 76 of the upper I-beam 22. In the illustrated embodiment, the lower I-beam 24 has a wider span than the upper I-beam 22. Thus, as shown in FIGS. 3 and 10, the vertical flanges 76 of the upper I-beam 22 lie just inwardly of the vertical flanges 70 of the lower I-beam when the belt 26 is clamped between the upper and lower I-beams 22 and 24. This arrangement has been found to provide good clamping of the belt 26, both during the initial clamping of the belt 26 upon tightening the screw 64, and also during subsequent pulling on the belt to draw the belt ends 28 together.

With reference now to FIG. 8, the upper and lower I-beams 22 and 24 are slidably connected to one another by guide rods 78 which center the I-beam with respect to the lower I-beam. The upper and lower I-beams 22 and 24 both have apertures near their respective ends 80 and 82. A first guide rod 78 extends through the apertures near one end 80 of the I-beams, 22 and 24, and a second guide rod 78 extends through the apertures near the other end 82 of the I-beams 22 and 24.

The guide rods 78 serve several functions. The guide rods 78 maintain the upper and lower beam pairs 22 and 24 interconnected as a single unit. The guide rods 78 also maintain the upper I-beam 22 centered with respect to the lower I-beam 24, thereby assuring that upon clamping of the belt 26, the vertical flanges 76 of the upper I-beam 22 remain immediately inward of the vertical flanges 70 of the lower I-beam 24. Preferably the guide rod 78 has an enlarged head 84 which is permanently fixed to the upper I-beam 22.

As shown in FIG. 8, the upper I-beam 22 falls down under the influence of gravity onto the lower I-beam 24. Thus, to insert a belt end 28 between the upper and lower I-beams 22 and 24, it is necessary with this arrangement to first lift up the upper I-beam 22 to provide clearance between the upper and lower I-beams 22 and 24.

The springs 86 are useful in reducing the amount of cocking of the I-beams in which the forward flanges 70, 76 are pulled closer together, as shown in FIG. 8, and the rear flanges 70, 76 are pivoted away from each other with the consequence that the rear flanges are not effectively gripping the belt.

More particularly, with continued reference to FIG. 9, the springs 86 bias the upper I-beam 22 upwardly into abutment with the bearing surfaces 66 of the respective tightening screws 62. This maintains the upper and lower I-beams 22 and 24 generally parallel and spaced from one another initially and the springs resist the rotation of the front flanges 70 and 76 toward each other and thereby reduce cocking of the I-beams 22 and 24.

Tightening of the tightening screws 62 overcomes the biasing force of the springs 86 to move the upper I-beam 22 downward toward the lower I-beam 24. The springs 86 have sufficient elasticity that the screw 62 may be screwed manually far enough downward to move the upper I-beam 22 into clamped engagement with a belt segment 26 situated between the upper and lower I-beams 22 and 24. The combination of the spring 86 and the guide rods 78 prevents the upper and lower I-beams 22 and 24 from becoming askew with respect to one another.

Figure 7:
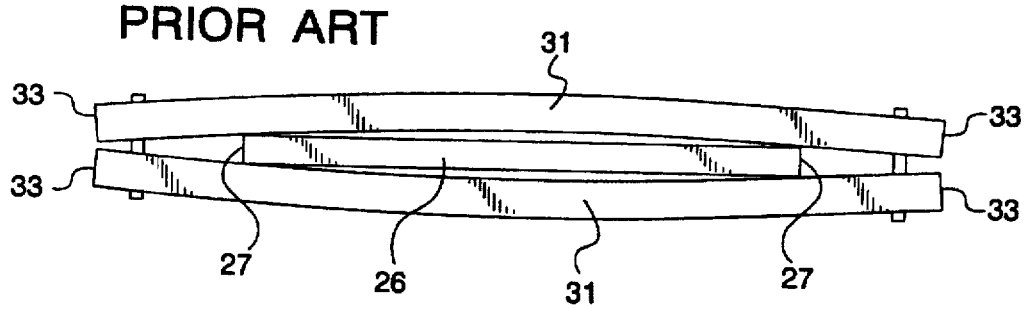
FIG. 7 is an end elevational view of a pair of flat, prior art clamping members clamping a belt portion therebetween, to illustrate the outward bowing of the center portion of the members away from the belts when the members are pressed together at a location spaced from the sides of the belt.

In their unclamped position, the clamping jaws 30 are slidable along the I-beams 22 and 24 from one end to the other, to optimally accommodate belts of different widths. That is, in the prior art, as illustrated in FIG. 7, the clamping plates 31 were clamped together at or near the ends 33 of the plates regardless of the width of the belt 26 being clamped. Hence, with a relatively narrow belt 26, the plates 31 were clamped at a location a considerable distance from the belt ends 27. This results in bowing of the clamping plates 31 as shown in FIG. 7. As discussed above, the bowing is undesirable since it reduces the area of contact between the belt 26 and the plates 31, thus reducing the clamping engagement of the belt by the plates 31. As shown in FIG. 7, when the clamping plates bow, they concentrate the pulling and gripping forces on the edges of the belt, leaving the central portion of the belt with less clamping and pulling forces than at the belt edges. Thus, the side edges of the belt are crushed with heavy forces while the middle of the belt is not severely clamped. It is desirable to clamp the plates, or as in the present invention, clamp the I-beams, adjacent the belt ends 27 to minimize the bowing effect.

In order to accommodate belts of different widths, and allow for positioning of the clamping jaws 30 adjacent the belt side edges 27 regardless of the belt width, the clamping jaws 30 are slidable to any desired position along the length of the I-beams 22 and 24. That is, the upper and lower I-beams 22 and 24 are of generally equal length, and are made sufficiently long to extend beyond the sides 27 of the belt 26 for the widest belt which may be employed.

The bearing surfaces 66 of the tightening screws 62 slide within the U-shaped channel 88 defined by the upper half of the upper I-beam 22, and the bearing surface portions 68 of the lower clamping link 52 slide within the U-shaped channel 90 defined by the lower half of the lower I-beam 24, to allow sliding repositioning of the clamping jaws 30 to any desired position along the length of the I-beams 22 and 24.

Figure 11:
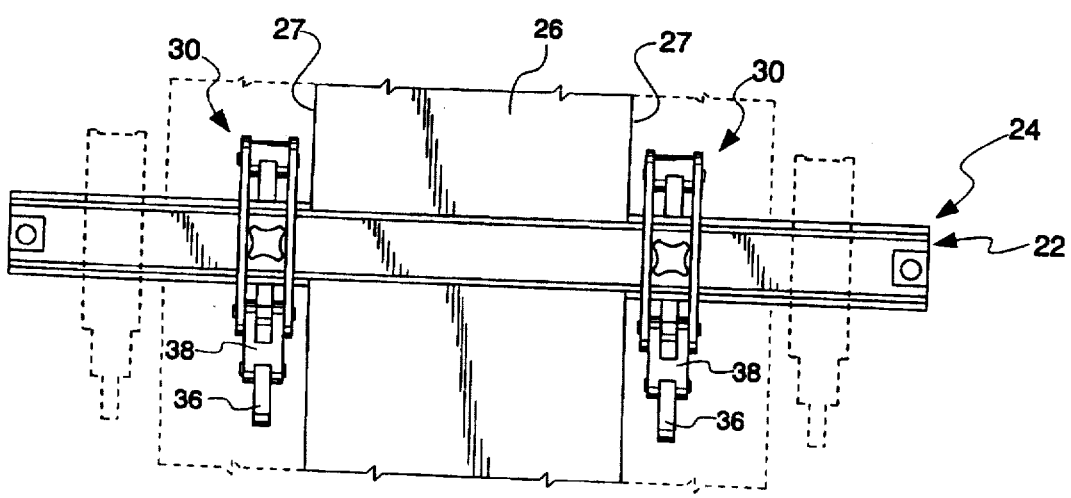
FIG. 11 is a plan view of the belt clamping and pulling apparatus of the present invention, illustrating in phantom the repositioning of the clamping jaws to accommodate belts of different widths.

FIG. 11 illustrates the variable positioning of the clamping jaws 30 dependent upon the width of the belt 26 to be clamped. A relatively wide belt 26 is illustrated in phantom and the positions of the clamping jaws 30 corresponding to this wide belt width are also illustrated in phantom. For a narrower belt 26, indicated by solid lines in FIG. 11, the clamping jaws 30 are moveable inwardly toward one another to the position shown, adjacent the belt side edges 27. Manifestly, the clamping jaws 30 are not limited to these two positions, and they may be slid to any desirable position along the length of the I-beams 22 and 24. Accordingly, any width of belt narrower than the length of the I-beams 22 and 24 may be clamped directly adjacent the side of the belt by the clamping and pulling apparatus 20 of the present invention.

With the clamping jaws 30 positioned adjacent the belt side edges 27, the aforementioned bowing problem is substantially eliminated. Accordingly, this slidable clamping jaw aspect of the present invention substantially eliminates the bowing problem of the prior art, and provides improved belt clamping without slippage.

In practice, to connect the belt ends 28 of a new belt 26 to form a continuous belt, or to connect the belt ends 28 formed upon tearing of a belt 26 to reform a continuous belt, a first belt end 28 is passed between a first upper and lower I-beam pair 22 and 24, in between the pair of clamping jaws 30 which support the I-beams 22 and 24. The clamping jaws are oriented, and the belt 26 is inserted with respect to the clamping jaws 30, such that the belt end 28 extends in the direction of arrows 56; that is, the belt end 26 extends in the direction in which it is to be pulled, as shown in FIG. 2.

After being passed between the upper and lower I-beams 22 and 24, and the I-beams positioned at the desired location near the belt end 28, the tightening screws 62 of the clamping jaws 30 are manually rotated clockwise to push the upper I-beam 22 downward. The screw 62 is rotated until the upper I-beam 22 is moved sufficiently downward that the portion of the belt 26 situated between the upper and lower I-beams 22 and 24 is clamped therebetween.

Thereafter, the other belt end 28 is inserted through the second pair of I-beams 22 and 24, and the tightening screws tightened to clamp the belt 26 between the upper and lower I-beams 22 and 24, in the same manner as the first belt end 28 described above.

At this point, the chains 32 extending between the respective clamping jaws 30 of the first belt end and the clamping jaws of the second belt end are slacked. Advancement of the length-adjusting handles 34 of the come-along mechanisms 33 shortens the length of the chains 32, to take up the slack in the chains 32 and begin pulling the clamped belt ends 28 toward one another. The pulling force which the chains 32 exert on the pulling links 36 of the clamping jaws 30 increases clamping force of the clamping jaws 30 onto the I-beams 22 and 24 to clamp more tightly against the belt ends as they begin to be pulled toward one another.

Further advancement of the handle 34 draws the belt ends 28 together. After the belt ends 28 have been drawn together, any of a variety of known belt fastening devices may be employed to permanently or temporarily join the belt ends together. The clamping and pulling apparatus 20 of the present invention holds the belt ends 28 together without any separating force acting on the belt ends 28. This allows for the belt joining to be performed in the absence of separating forces, as desired.

After the completion of the belt end connection, the comeback mechanism is released to relieve the tension in the chains and substantially eliminate the pulling force of the chains on the clamping jaws 30. Thereafter, the upper and lower I-beams may be removed from the belt by first loosening the tightening screw 62 and opening the clamping jaws 30 to allow sliding of the lower I-beam from its location under the belt and the upper I-beam and clamping jaws 30 may be lifted from the top side of the now endless belt. Thus, first the tightening screws 62 are loosened, then the upper and lower clamping links 48 and 52 separated.

A hand grip in the form of an elongated slot 92 is provided in the vertical portions of the L-shaped upper clamping links 48. While the operator maintains this pulling force on the upper clamping links 48 to maintain separation of the clamping links 48 and 52, and thus separation of the I-beams 22 and 24, the clamping jaws may be slid laterally outward from the belt and disengaged from their respective I-beams 22 and 24. Thereafter, the operator may release the upper clamping links 48 to allow the clamping jaws 30 to return to their natural configuration, with the I-beams 22 and 24 slightly separated, for use of the clamping and pulling apparatus 20 in subsequent applications.

While the aforementioned embodiments of the belt clamping and pulling apparatus 20 discussed above have been found well-suited for clamping and tensioning a belt, it has been found that with the aforementioned design the I-beams 22 and 24 have a tendency to go into torsion and twist undesirably when the clamping force reaches a high level, on the order of approximately 10,000 pounds. The twisting of the I-beams reduces the gripping strength of the apparatus 20 on a belt when the rear flanges lift from the belt and/or the I-beams warp from the relaxed I-shape under high loads being applied thereto at the locations of the clamping jaws. That is, the torsion of the I-beams at such high forces causes the I-beams 22 and 24 to rotate about their forward edges which reduces the belt gripping strength by changing the manner of gripping the belt by the I-beam flanges. The torsional twisting of the I-beams 22 and 24 and the rotation of the I-beams lift rear flanges 166 and 172 from the belt, thereby significantly reducing their respective rearward areas of clamping engagement of the I-beams with the belt, and causing a concentration of the force on forward flanges 168 and 174 that tend to pinch the belt with a high degree of force that could damage the belt. As stated earlier, the difference in the widths of the upper and lower flanges forces the belt to curve between the flanges. In order to pull the belt through these curves, the belt must be pulled with extremely high forces.

Because the preferred I-beams are made of aluminum and deliberately kept small in cross-section to reduce their weight, they tend to twist and warp at very high loads, e.g., 10,000 lbs. Attempts were made to reduce torsional warping of the I-beams by adding a central rib to the I-beams to stiffen them. This was found inadequate to prevent warping under high clamping forces and did not prevent the rotational lifting of the rear flanges of the I-beams under high forces.

Figure 12:
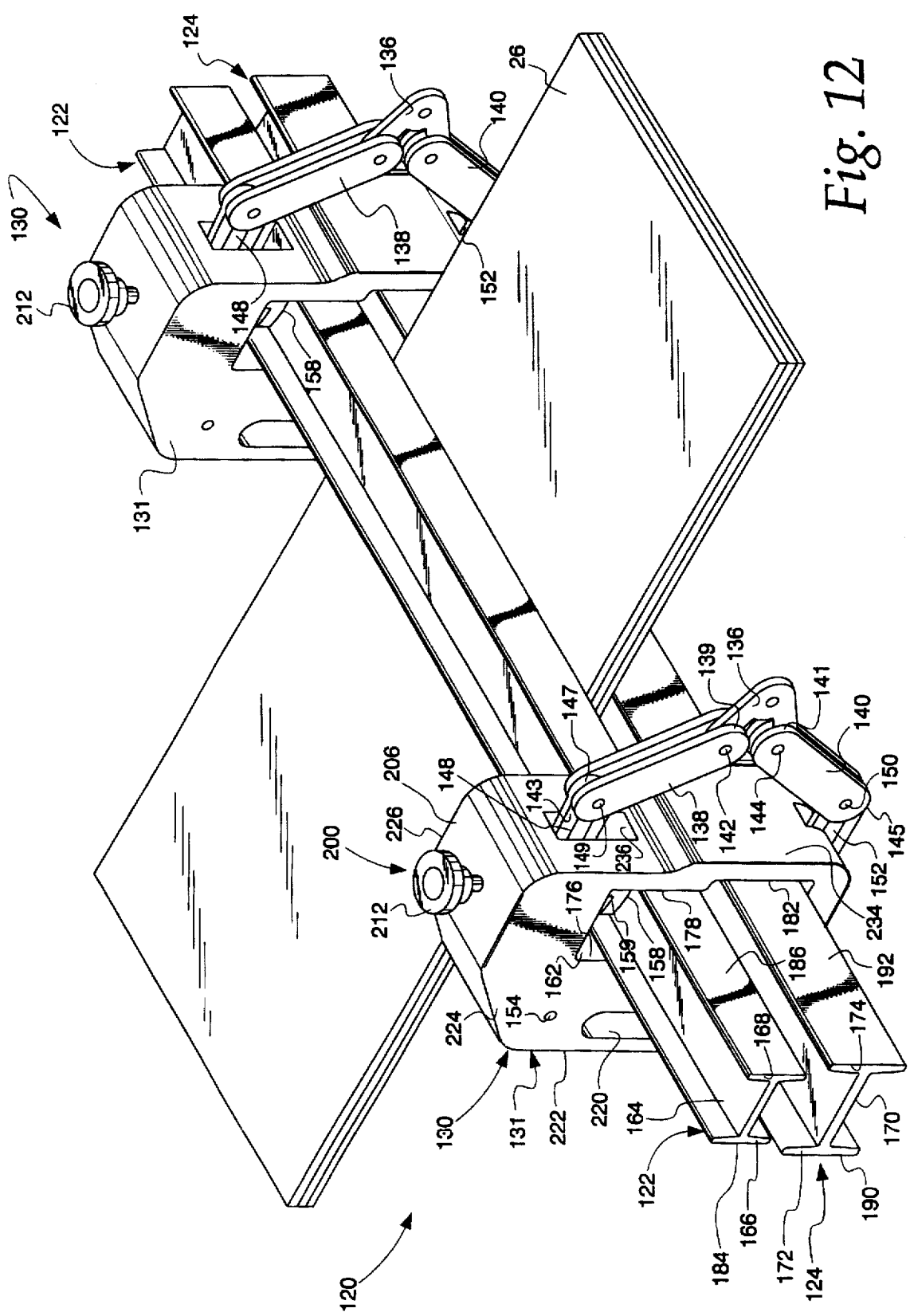
FIG. 12 is a perspective view of a preferred embodiment belt clamping and pulling apparatus embodying various features of the present invention, showing a pair of clamping apparatus engaging a belt end.
Figure 13:
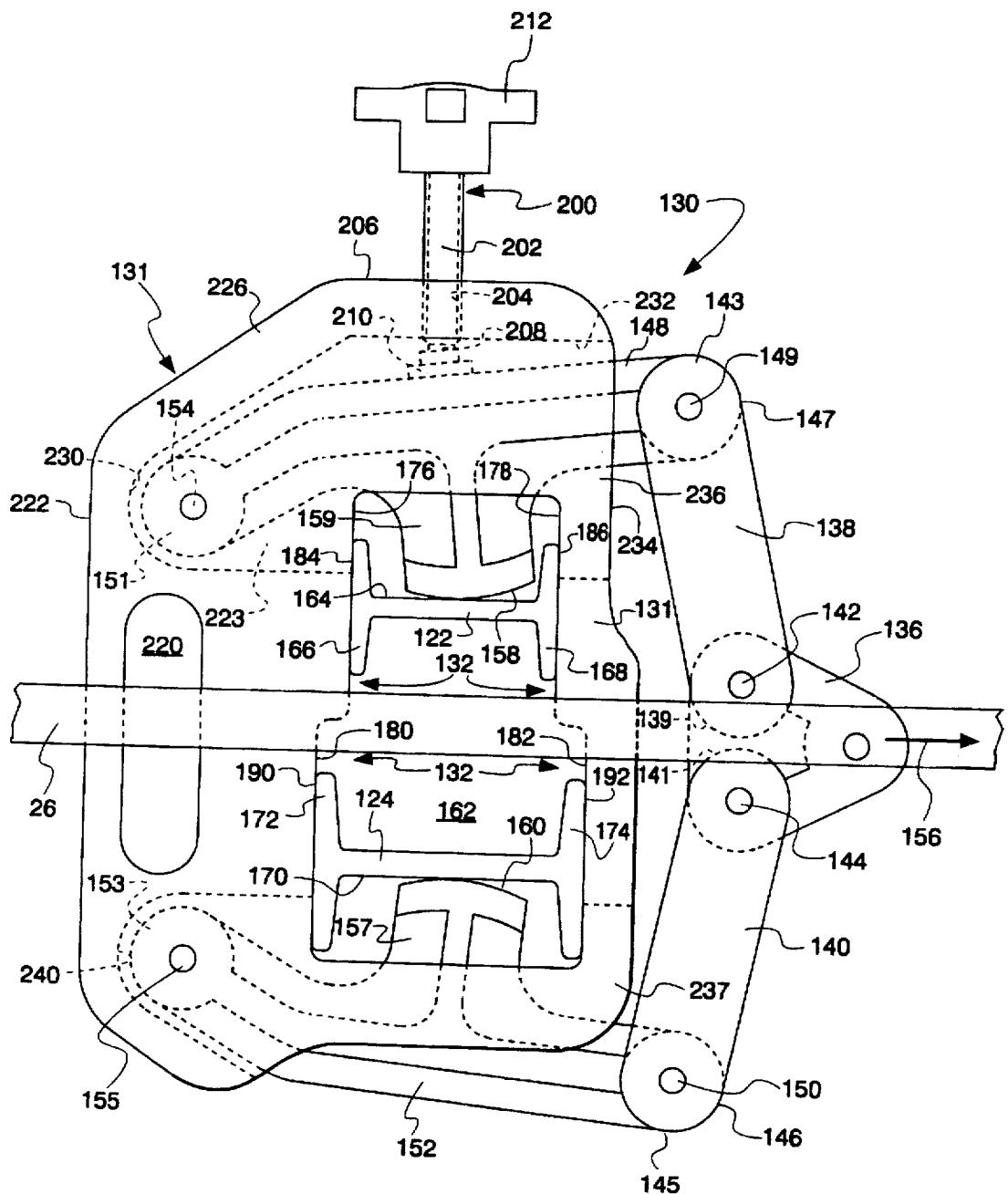
FIG. 13 is an elevational view of the preferred belt clamping and pulling apparatus of FIG. 12, shown in its release position.
Figure 14:
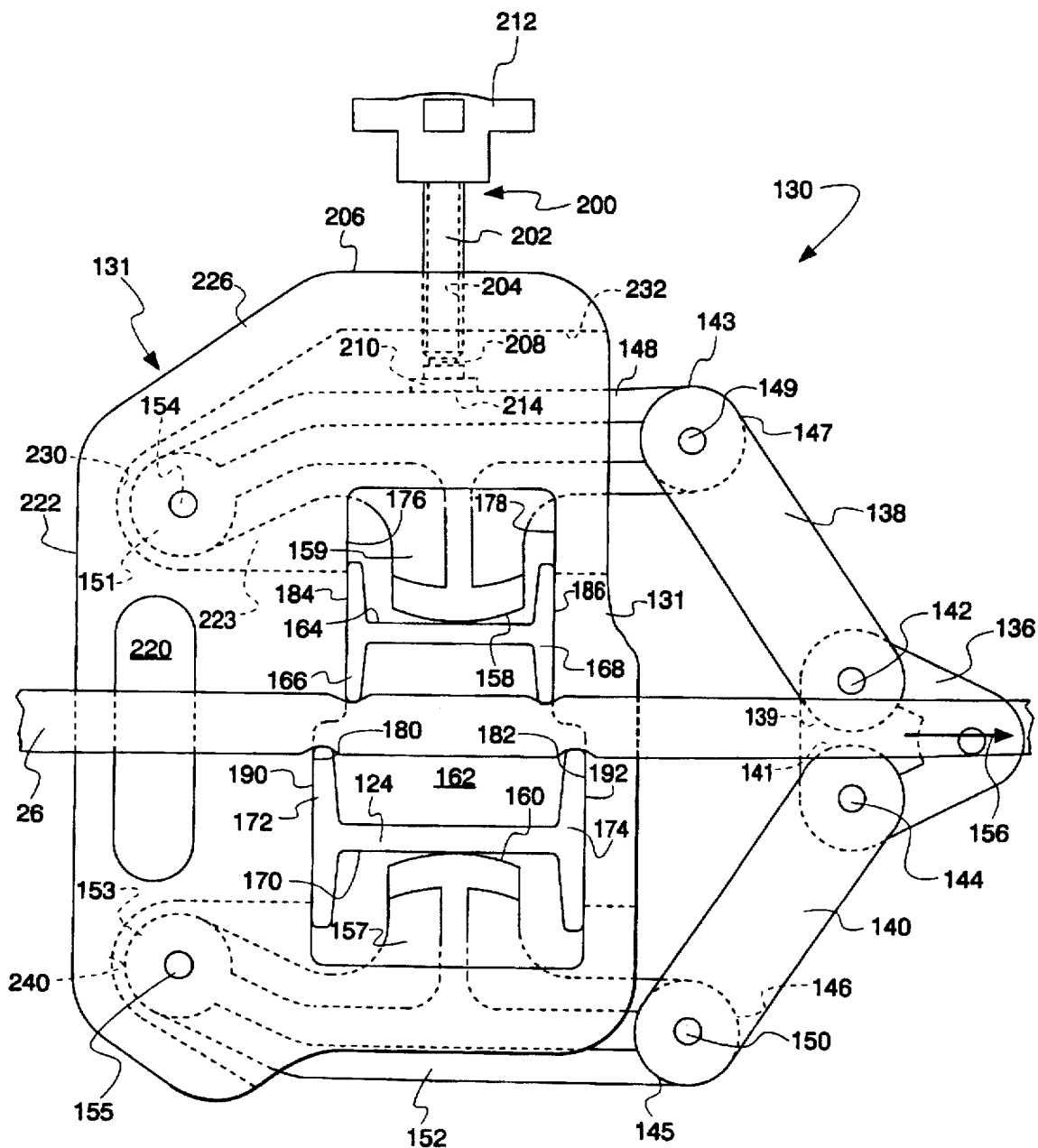
FIG. 14 is an elevational view of the preferred belt clamping and pulling apparatus of FIG. 12, shown in its clamping position.

In order to prevent torsional twisting and rotation of the I-beams 22 and 24 under high clamping forces, the clamping jaws 130 of one preferred belt clamping apparatus 120 illustrated in FIG. 12 each have a clamping jaw frame body 131 having guide means 132 for guiding the I-beams 122 and 124 for vertical movement between the release position of FIG. 13 and the clamped position of FIG. 14. The illustrated vertical guide means 132 is in the form of flat, vertical guiding surfaces 176, 178 and 180, 182 which are positioned closely adjacent the flat, vertical, outer walls of the flanges 166, 168 and 172, 174 of the upper and lower I-beams 122 and 124 to guide the I-beams and prevent the I-beams from undergoing any significant twisting or warping of their I-cross-section and any rotational motion that would lift rear flanges 166 and 172 from the belt. That is, the flat, vertical walls 176, 178, 180 and 182 of the frame 131 allow vertical sliding of the I-beam flanges therealong but resist and prevent rotation of the rear flanges 166 and 172 when the forces applied to the I-beams tend to rotate and/or twist the I-beams.

More specifically, with reference to FIGS. 13 and 14, the clamping jaw frame 131 pivotally mounts a linkage arrangement having a pulling link 136 which is pivotally connected to both upper and lower intermediate links 138 and 140 at their respective first ends 139 and 141 by respective pivot pins 142 and 144 as in the clamping jaw 30 discussed above. The respective other, second ends 143 and 145 of the intermediate links 138 and 140 are pivotally connected to respective first ends 147 and 146 of clamping levers 148 and 152 by respective pivot pins 149 and 150. The respective other, second ends 151 and 153 of the clamping links 148 and 152 are pivotally connected to the vertical guide member 131 by respective pivot pins 154 and 155. The upper and lower intermediate links 138 and 140 are preferably both of approximately the same length, and the upper and lower clamping links 148 and 152 are also preferably both of approximately the same length, so that the linkage arrangement of the clamping jaw 130 is approximately symmetrical above and below the pulling link 136, as illustrated in FIGS. 13 and 14.

The upper and lower clamping levers 148 and 152 have respective integral upper and lower rocker legs 159 and 157 which extend into the aperture 162 with respective arcuate bearing surfaces 158 and 160 of the rocker legs 159 and 157 residing in the aperture 162 and facing toward one another. Pulling on the pulling link 136 in the direction of arrow 156 pivots the respective first ends 146 and 147 of the upper and lower clamping levers 148 and 152 toward one another, whereby the upper and lower arcuate bearing surfaces 158 and 160 of the upper and lower rocker arms 159 and 157 are drawn toward one another to effect the clamping of a belt by the I-beams 122 and 124.

Each of the clamping jaws 130 has a large central opening or an aperture 162 through which the upper and lower I-beams 122 and 124 pass. The upper I-beam 122 is disposed adjacent and directly beneath the upper arcuate bearing surface 158, and the lower I-beam 124 is disposed adjacent and directly above the lower arcuate bearing surface 160. Accordingly, the drawing together of the upper and lower arcuate bearing surfaces 158 and 160 which is effected by pulling on the pulling link 136 in the direction of arrow 156 as discussed above, causes the arcuate bearing surfaces 158 and 160 to bear against respective upper and lower I-beams 122 and 124 to force the I-beams 122 and 124 toward one another. Specifically, the upper arcuate bearing surface 158 bears against flat upper surface 164 of the upper I-beam 122 between the opposite flanges 166 and 168 of the upper I-beam 122 to force the upper I-beam 122 downwardly. The lower arcuate bearing surface 160 bears against the flat lower surface 170 of the lower I-beam 124 between the opposite flanges 172 and 174 of the lower I-beam 124 to force the lower I-beam 124 upwardly.

The force exerted on the I-beams 122 and 124 by the respective bearing surfaces 158 and 160 is mostly in the vertical direction. A component of the force is the horizontal direction; and the force tends to be directed forwardly of a center point in the respective web surfaces 164 and 170 so as to pivot the I-beams about their forward flanges 168 and 174 with the rear flanges 166 and 172 lifting from the belt. By making the bearing surfaces 158 and 160 arcuate rather than flat, rolling contact is established between the bearing surfaces and their respective I-beams; and these lines of rolling contact shift forwardly to the right in FIG. 13, as the clamping levers 148 and 152 pivot toward each other about their respective pivot axes through the pivot pins 154 and 155. This rolling line contact provided by these arcuate bearing surfaces 158 and 160 results in significantly less frictional and horizontal force, i.e., longitudinally directed force, than would flat bearing surfaces.

The illustrated, vertical guiding means 132, through which the upper and lower I-beams 122 and 124 pass, is formed in the aperture 162 with a smaller width opening to receive the narrower upper I-beam 122 and a larger width opening to receive the lower, wider I-beam 124. With specific reference to FIGS. 13 and 14, the guiding means 132 comprises a smaller width opening between the upper pair of opposing, vertically-extending, guiding surfaces 176 and 178 and a larger width opening between the lower pair of opposing, vertically extending guiding surfaces 180 and 182.

To allow free, vertical sliding of the upper I-beam 122, while supporting the I-beam flanges against twisting from their relaxed I-shaped, cross-section, the distance between the upper pair of opposing vertical guiding surfaces 176 and 178 is slightly larger than the width of the upper I-beam 122 between the opposite, vertical end walls 184 and 186 of its flanges 166 and 168. This spaces slightly the end walls 184 and 186 of the upper I-beam 122 for free sliding along the adjacent respective upper vertical guiding surfaces 176 and 178. Also, the close proximity of the vertical guiding surfaces 176 and 178 adjacent either side of the vertical end surfaces 184 and 186 of the upper I-beam flanges 166 and 168 prevents any significant rotational movement of the rear flange 166 of the upper I-beam 122, and limits the latter to vertical displacement.

Likewise, the distance between the lower pair of opposing vertical guiding surfaces 180 and 182 is slightly larger than the width of the lower I-beam 124 between the opposite, vertical end surfaces 190 and 192 of its flanges 172 and 174, to space slightly the end walls 190 and 192 of the lower I-beam for free sliding along the adjacent respective lower vertical guiding surfaces 180 and 182 to limit any significant rotation of the rearward flange 172 of the lower I-beam 124. Thus, the lower I-beam may move vertically but is prevented from any significant twisting or any lifting of the rear flange from the belt.

By way of illustrative example, good results were obtained by forming the jaw frame body 131 as a one-piece aluminum casting, with the aperture 162 formed to provide at total clearance of approximately 1/32 inch between the end surfaces 184, 186 and 190, 192 of the respective I-beams 122 and 124 and their respective vertical guiding surfaces 176, 178 and 180, 182.

As with the embodiment of FIGS. 1–11, each of the clamping jaws 130 of FIGS. 12–14 has a pretightening means 200 in its cast frame 131 for manually adjusting the distance between the upper and lower I-beams 122 and 124 to clamp the belt portion between the I-beams at a pretightened position prior to pulling on the pulling member 136 to reduce slippage of the belt portion with respect to the I-beams 122 and 124 upon initial pulling of the pulling link 136. In the embodiment illustrated in FIGS. 12–14, the pretightening means 200 has a threaded shaft 202 which is threadably engaged in a threaded aperture 204 in the upper end 206 of the frame 131. The leading end 208 of the threaded shaft 202 has an enlarged bearing pad 210 connected thereto in a manner which allows rocking movement of the pad 210 relative to the shaft 202. A rotatable knob 212 is affixed to the upper end of the shaft 202. By manually rotating the knob and turning the shaft 202 further down, the pad 210 pushes down the upper clamping lever 148 to pivot it about pivot pin 154. The pad 210 rocks on the end 208 of the shaft 202 to assure that the lower surface 214 of the pad 210 which engages with the upper lever 148 extends at the same angle as the upper surface of the upper clamping lever 148 to assure that lower surface 214 of the pad 210 remains flush against the upper surface of the upper clamping lever 148 during pretightening. Upon pulling of the pulling link 136 with great force in the direction of arrow 156, the upper clamping lever 148 pivots downwardly and out of contact with the pad 210 of the pretightening means 200. The upper clamping lever 148 is forced downward during pretightening, by manually rotating the pretightening means 200, such that the bearing surface 158 moves towards the bearing surface 160.

In order to manually grip the casting frame to move the clamping jaw 130, an elongated vertical gripping slot 220 is molded into the casting adjacent its rear end wall 222. Thus, one may insert fingers through the slot 220 and grip the clamping jaw 130.

As best seen in the perspective view of FIG. 12, each jaw frame body 131 is preferably a one-piece, block-shaped body having opposite vertical sides 224 and 226. Within the block-shaped body is the large central opening 162 for receiving the I-beams therein. The sides of the cavity include vertical guiding surfaces 176, 178, 180 and 182 that provide a large surface area for guiding the I-beams 122 and 124 and for engaging the entire vertical height of the I-beam flanges.

The block-shaped body has a shorter rear end wall 222 and a taller forward end wall 232 at the forward end 234. To admit the clamping levers 148 and 152 into the interior of the block-shaped body 132, horizontally extending, upper and lower slots 236 and 237 are formed in the block-shaped body 131, as illustrated in FIG. 13. The upper slot 236 intersects the central opening and allows the rocker arm 159 of the upper clamping link 148 to project down into the central opening 162. The lower slot 237 is in the shape of a channel of generally uniform width centered between the opposite sides 224 and 226 of the vertical guiding member 131. The channel-shaped slot 237 has a narrow forward end 240 which widens as it extends to the forward end 234 of the body 131. The channel-shaped slot extends up onto communication with the opening 162 to accommodate passage of the rocker arm 157 of the lower clamping lever 152 into the opening 162. The upper and lower slots 236 and 237 are both made tall enough to allow pivotal movement of their respective upper and lower clamping levers 148 and 152 within the block-shaped body 131.

After a pair of I-beams 122 and 124 have their end portions passed through the openings 162 of a pair of clamping jaws 130, a belt 56 is passed between the upper and lower I-beams 122 and 124 and the clamping jaws 130 are slid to positions adjacent respective sides of the belt, as illustrated in FIG. 12. Then, the pretightening means 200 of the clamping jaws 130 are tightened for an initial clamping of the belt between the I-beams with a low level force. Thereafter, the pulling links 136 are pulled in the direction of arrow 156 of FIG. 13 to tightly clamp the belt between the upper and lower I-beams 122 and 124 with a level of force. The vertical guiding surfaces 176, 178, 180 and 182 being positioned closely adjacent respective vertical walls 184, 186, 190 and 192 of the flanges of the I-beams, act to guide the I-beams for vertical translation and prevent the upper and lower I-beams 122 and 124 from any substantial twisting or warping, and from lifting of the rear flanges 166 and 172 from the belt. Hence, even at relatively high clamping forces on the order of approximately 12,000 pounds, the upper and lower I-beams 122 and 124 remain untwisted and tightly clamp the portion of the belt therebetween.

While it has been found the embodiment described above is effective in limiting the tendency of the I-beams 122 and 124 to twist and rotate as the clamping jaws 130 are exposed to high loads, it is desirable to simplify the construction of the clamping jaws and thereby reduce the cost thereof while still retaining the pretightening and twist-limiting features of the previously described embodiments. The clamping jaw 130, as described above, uses a plurality of links to effect clamping of a belt end therebetween. In practice, it has been observed that the lower rocker arm 157 did not move when a pulling force was applied to the clamping jaw 130. Nevertheless, it seemed that the use of a clamping jaw having only one movable clamping lever would exacerbate the twisting problem as the clamping force obtainable with two movable clamping levers which should exert substantially equal and opposed clamping forces on the belt end would no longer be available.

In order to substantially simplify the construction of the aforesaid clamping jaws while at the same time limiting the twisting of clamping members during pulling of the clamping jaws, the clamping jaw 330 of a preferred belt clamping apparatus is illustrated in FIGS. 15–18 with the clamping jaws 330 including a frame 332 which has a single clamp lever 334 in the form of an L-shaped lever arm pivotally mounted thereto. The L-shaped lever arm 334 has a first portion 336 which is pivotally connected at one end 338 thereof to a pulling link 340 which can be attached to a come-along mechanism 33 such as used with the previously described embodiments. At the other end 342 of the first portion 336, a second portion 344 extends into a slot 346 provided in the frame 332 so that one end 348 of the second portion 344 of the L-shaped lever arm 334 engages a piston 350 which is guided and supported for vertical movement relative to the frame 332. At the ends 342 and 352 of the first and second portions 336 and 344, respectively, of the L-shaped lever arm 334, an arcuate portion 354 is formed. A pivot pin 356 extends through the frame and the arcuate portion 354 of the L-shaped lever arm 334 so that when a pulling force is applied to the pulling link 340, the L-shaped lever arm 334 is caused to pivot about the pin 356 with the one end 348 of the second portion 344 of the lever arm 334 exerting a downward force on the piston 350.

Similar to the previously described embodiments, the clamping jaws 330 have a central opening 358 through which upper and lower I-beams 360 and 362 can pass. The upper I-beam 360 includes opposite vertical flanges 364 and 366 with a horizontal web 368 extending therebetween and the lower I-beam 362 includes vertical flanges 370 and 372 with a horizontal web 374 extending therebetween, as seen in FIG. 17. The upper I-beam 360 is positioned so that the piston 350 can be moved vertically downward into engagement with its web 368. Accordingly, exerting a pulling force on the pulling link 340 causes the L-shaped lever arm 334 to pivot about the pivot pin 356 and force the piston 350 into engagement with the web 368 of the upper I-beam 360 so as to cause the upper I-beam 360 to move towards the lower I-beam 362.

The piston is provided with an arcuate bearing surface 376 for allowing a rolling area of contact with the end 348 of the lever arm 334 as the piston moves vertically. The one end 348 of the second portion 344 of the lever arm 334 can thereby engage the bearing surface 376 as by rolling contact to reduce the frictional, horizontal force component exerted on the piston 350 and upper I-beam 360. Of course, the arcuate rolling action can be achieved by having the arcuate surface formed on the lever arm rather than on the piston or by having arcuate surfaces on both the lever arm and the piston.

In other clamp jaw arrangements, the pulling force was exerted approximately at the vertical mid-point of the clamp jaw arrangements, i.e., coincident with the horizontal position of the belt end. However, in clamping jaw 330, the pulling force is exerted at a point below the vertical center point of the clamping jaw 330. As can be seen in FIG. 15, the first portion 336 of the lever arm 334 extends from the pivot pin 356 downward to the pulling link 340 to provide a longer lever arm and hence a greater mechanical advantage. Thus, when a pulling force is exerted on the pulling means or link 340, the pulling force is transmitted to the lever arm 334 through a pivot pin 377 pivotally connecting the link 340 to the lever arm 334 so that the lever arm 334 pivots about the pin 377. This pivoting causes the lever arm 334 to simultaneously pivot about the pivot pin 356 to rapidly and forcefully cause the shorter second arm portion 344 to engage the arcuate bearing surface 376 and rapidly cause downward movement of the piston 350 so that it forcefully contacts the web 368 of the upper I-beam 360 to rapidly move it towards the lower I-beam 362 and clamp the belt end therebetween. By this arrangement, the clamping jaw 330 is provided with improved action in applying a rapid downward force to the upper I-beam 360 which reduces the tendency of the upper I-beam 360 to roll on the belt end, as more fully discussed below.

To limit the torsional twisting and rotation of the I-beams 360 and 362 as the belt ends are pulled towards one another under high loads, the clamping jaw 330, similar to the clamping jaw 130, is provided with guide means 378 on the clamping jaw frame 332 for guiding the upper I-beam 360 for vertical movement.

Figure 18:
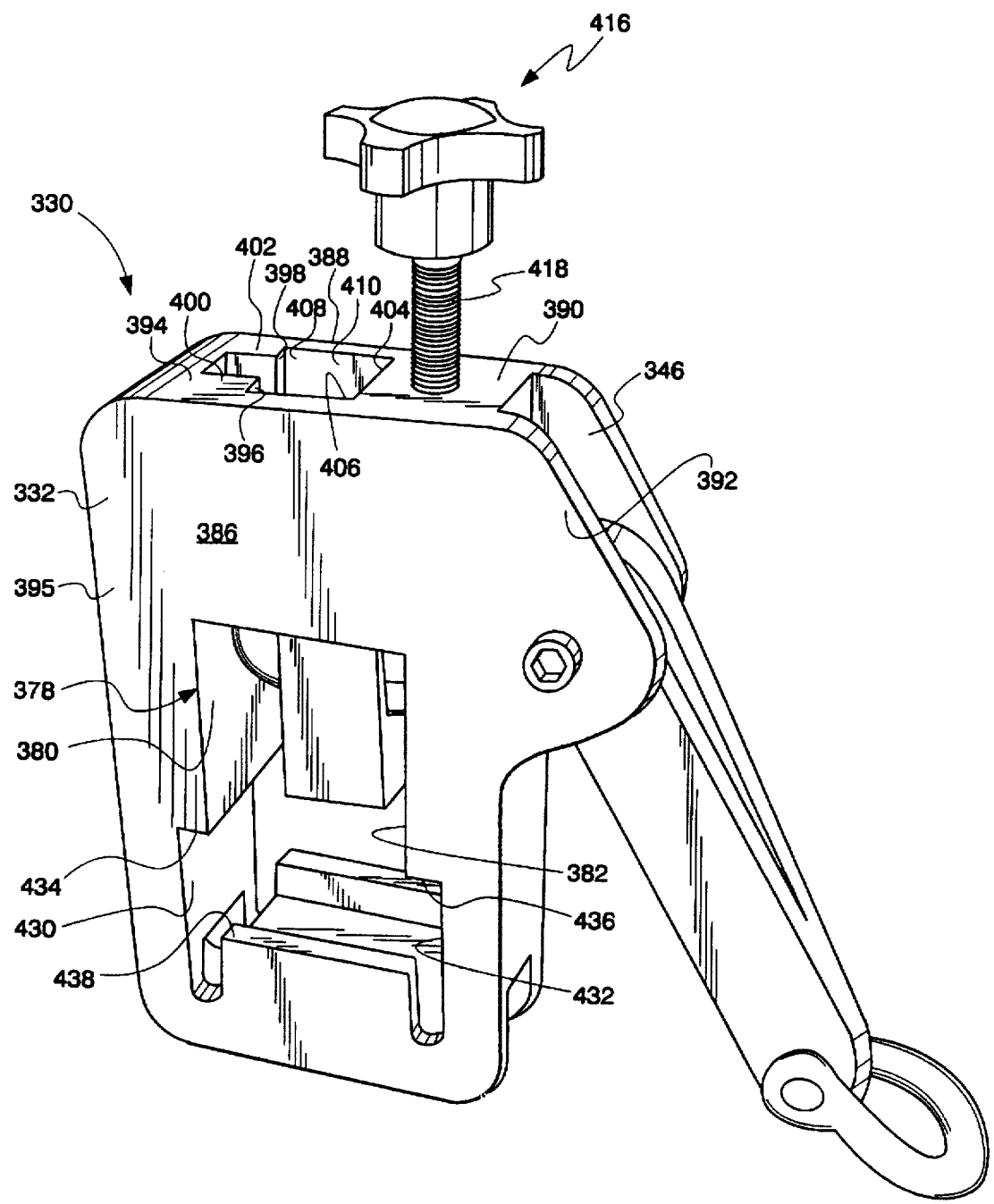
FIG. 18 is a perspective view of the frame and clamping lever of FIGS. 15–17.

Referring to FIG. 18, the guide means 378 is in the form of flat, vertical guiding surfaces 380 and 382 which are positioned closely adjacent the vertical flanges 364 and 366, respectively, to guide the upper I-beam 360 and to limit the upper I-beam 360 from rolling or rotating about the front vertical flange 360 as would lift the rear vertical flange 364 from the belt.

More specifically, referring to FIGS. 15 and 17, the frame 332 of the clamping jaw 330 has a bottom side 384. The lever arm 334 has a length from the pivot pin 356 to the pivot pin 377 substantially corresponding to the vertical distance between the pivot pin 356 and the bottom surface 384 of the frame. As discussed previously, this configuration allows the lever arm 334 to be connected to chains of a come-along mechanism 33, or the like, at a position well below the level of the belt end between the I-beams 360 and 362. As best seen in FIG. 16, the belt 26 is positioned relative to the clamping jaw 330 at or near the vertical mid-point thereof. As such, as the come-along mechanism 33 is initially torqued, the lever arm 334 rapidly pivots about the pivot pin 356 so that the end 348 of the second portion 344 forces the piston 350 downward until it bears against the web 368 of the upper I-beam 360 to force the upper I-beam 360 down to clamp the belt end between the I-beams 360 and 362. In this manner, the relatively long first portion 336 of the lever arm 334 provides improved action by providing a good mechanical advantage during the initial tensioning of the come-along mechanism 33 to provide a rapid and forceful clamp down force through the piston 350 onto the upper I-beam 360.

As previously mentioned, the piston 350 is guided and supported for vertical movement relative to the frame 332. As seen in FIG. 18, the frame is formed as a one-piece casting and has sides 386 and 388, a threaded block portion 390 between the sides 386 and 388 toward a forward end 392 of the frame 332, and a bracket portion 394 toward the rearward end 395 of the frame 332 having a U-shaped cross-sectional configuration. The U-shaped bracket portion 394 has forwardly facing vertical surfaces 396 and 398 on legs 400 and 402, respectively, such that the rear surface 404 of the guide block portion 390 and inner opposing surfaces 406 and 408 of the frame sides 386 and 388, respectively, and the forwardly facing surfaces 396 and 398 cooperate to form a substantially square shaped guide slot 410 for the piston 350 which has a correspondingly shaped cross section. The piston 350 is in the form of an elongate block and is provided with an aperture 412 therethrough for receipt of the end 348 of the second portion 344 of the lever arm 334. Thus, the piston 350 is supported by the lever arm 334 for vertical movement relative to the frame 332 and is guided therein by the guide slot 410. The piston aperture 412 is bounded by the bearing surface 376 at the bottom thereof and by an upper arcuate bearing surface 414 at the top of the aperture 412. Thus, when the clamping force is removed from the belt 26, the lever arm 336 can be manually pivoted so that the end 348 of the lever arm 336 bears against the arcuate surface 414 and forces the piston 350 upward in the guide slot 410 to move the upper I-beam 360 upward and off of the belt 26.

Similar to the previously described embodiments, a pretightening means 416 is provided in the frame 332. The pretightening means 416 functions similar to the previously described pretightening means in that it has a threaded shaft 418 which is threadably received in the threaded block portion 390. The threaded shaft 418 has a portion which can be extended into the slot 346 of the frame 332, with the portion being connected to a bearing pad 420 to allow the pad 420 to engage a top surface 422 of the second portion 344 of the lever arm 334. The bearing pad 420 is pivotally connected to the shaft so that the pad remains flush with the upper surface 422 as the threaded shaft is screwed into the frame 332. To facilitate the screwing action, the threaded shaft 418 is provided with an enlarged rotatable knob 424. Thus, when the knob 424 is rotated, the shaft 418 extends downward through the block 390 and into the slot 346 so that the pad 420 pushes the lever arm 334 down to pivot about pivot pin 356. This downward force on the lever arm 334 causes the piston 350 to force the upper I-beam 360 into clamping engagement with the belt 26. Thus, the force by which the upper and lower I-beams 360 and 362 clamp the belt 26 therebetween, before the pulling force is exerted on the pulling link 340, can be manually adjusted so as to substantially limit any slippage of the I-beams 360 and 362 upon the initial pulling exerted upon the pulling link 340.

The guide surfaces 380 and 382 ensure that rolling of the upper and lower I-beams 360 and 362 is substantially limited. During the pulling of the belt ends toward one another, the pulling force exerted on the clamping jaws can be substantial, i.e., as much as 10,000 lbs., as previously discussed. During this continued pulling, the upper I-beam 360 is limited from twisting or rotating about the forward flange 366 by the vertical guiding surfaces 380 and 382. Similar to the upper I-beam 360, the lower I-beam 362 has a tendency to want to twist or rotate about its forward flange 372 during continued pulling on the clamp jaw under high loads and to thereby move the rear flange 370 off of engagement from the belt 26 so as to compromise the clamping arrangement afforded by the differently sized I-beams 360 and 362. To counteract this, the frame 332 is formed with a lower pair of vertical guiding surfaces 430 and 432 which are positioned closely adjacent to the vertical flanges 370 and 372, respectively. In this manner, the lower I-beam 362, similar to the upper I-beam 360, is substantially limited in the amount of twisting or rotating that can take place during the application of high load pulling forces on the clamping jaw 330. To further restrict the lower I-beam 362 from any potential movement during pulling on the clamping jaw 330, the frame 332 is provided with shoulders 434 and 436 between the upper pair of vertical guide surfaces 380 and 382 and the lower pair of guide surfaces 430 and 432, respectively. The frame 332 further includes a raised anvil surface 438 between the vertical guide surfaces 430 and 432. The lower I-beam 362 and the lower pair of vertical guide surfaces 430 and 432 and the raised anvil surface 438 are sized so that when the lower I-beam 362 is inserted through the frame central opening 358, the web 374 of the lower I-beam 362 rests on the anvil surface 438 with the rear and front flanges 370 and 372 abutting the lower vertical guide surfaces 430 and 432 and the shoulders 434 and 436 at the upper end of the flanges 370 and 372. When inserted in the central opening 358, the lower I-beam 362 is thus snugly received therethrough so as to substantially limit the movement of the lower I-beam 362 as high load pulling forces are exerted on the clamping jaw 330.

In practice, a belt is positioned between the upper and lower I-beams 360 and 362. The clamping jaws 330 are then manually slid along the I-beams to a position adjacent each of the longitudinal sides 27 of the belt 26. A carrying handle 440 may be gripped when sliding the clamping jaw. The handle 440 can be formed on the rearward end 395 of the frame 332, as seen in FIGS. 15 and 17. The pretightening means 416 is manually tightened to initially clamp the belt between the I-beams 360 and 362 so as to limit any slippage during initial pulling of the belt ends toward one another. During such pulling, the lever arm 334 pivots to exert a force on the piston 350 and upper I-beam 360 so as to move the I-beam 360 toward the lower I-beam 362 to tightly clamp the belt 26 therebetween. As the pulling force is initially exerted at a position below the belt level on an extended lever arm, the action with which the upper I-beam 360 clamps down upon the belt 26 and lower I-beam 362 is quick. In moving the upper I-beam 360 downward toward the lower I-beam 362, the vertical surfaces 380 and 382 guide the I-beam 360 for vertical movement and substantially limit the I-beam 360 from twisting or rotating about the forward flange 366 during initial pulling and continued high load pulling. Similarly, the lower I-beam 362 is substantially limited from any movement as in twisting or rotating about its front flange 372, as well as any vertical movement in the opening 358 by the vertical surfaces 430 and 432 in conjunction with the abutment shoulders 434 and 436 and the anvil surface 438. Thus, the clamping jaw 330 has a simplified construction with only one clamping lever 334, and simultaneously reduces the tendency of the upper I-beam 360 driven by the clamping lever 334 to roll along the belt end.

While the invention has been described with regard to its preferred embodiments, which constitute the best modes known to the inventor, it should be understood that various changes and modifications may be made without departing from the scope and spirit of the invention which is intended to be set forth in the claims appended hereto. For instance, the invention is not limited to I-beams, but lends itself to use with a variety of clamping members.

What is claimed is:

1. In a belt pulling and clamping apparatus, the combination comprising:
    a frame;
    first and second clamping members associated with the frame for clamping upper and lower sides of a belt end;
    at least one clamping lever mounted on the frame for exerting a force on at least one of the first and second clamping members to clamp the belt therebetween;
    a pulling means connected to the clamping lever for pivoting the lever to exert a force on the clamping lever to cause the first and second clamping members to tightly grip a belt end therebetween; and
    substantially vertical guiding surfaces on the frame along which the one of the first and second clamping members may slide vertically, and which limit twisting and rotation of the clamping members as the clamping lever moves to cause the clamping members to tightly grip the belt end under high loading forces from the pulling means.

2. A pulling and clamping apparatus in accordance with claim 1 in which the clamping members are I-beams having vertically directed flanges for engaging and sliding along the substantially vertical guiding surfaces on the frame.

3. An apparatus in accordance with claim 2 in which walls on the frame define a central opening therein with the I-beam clamping members being disposed in the central opening; and
    the substantially vertical guiding surfaces being formed on the walls on opposite vertical sides of the central opening.

4. An apparatus in accordance with claim 3 wherein the first and second I-beam clamping members have different first and second widths; and
    upper and lower opposite portions of the walls having the substantially vertical guiding surfaces are spaced at different distances slightly greater than the respective first and second widths for engagement by the respective flanges of the first and second clamping members.

5. An apparatus in accordance with claim 2 wherein the at least one clamping lever comprises a pair of clamping levers for exerting opposed clamping forces on the respective first and second clamping members to clamp the belt therebetween and having rounded surfaces thereon which roll along the I-beams as the clamping levers pivot toward each other, and the I-beams translate vertically along the substantially vertical guiding surfaces.

6. An apparatus in accordance with claim 1 wherein a slidable piston is mounted for sliding movement in the frame and said clamping lever forces the piston against one of the clamping members to grip the belt.

7. The belt pulling and clamping apparatus of claim 1 wherein the clamping lever comprises a lever pivotally mounted to the frame having a first portion pivotally connected to the pulling means and a second portion extending in the frame to drive the one of the first and second clamping members towards the other of the first and second clamping members as the lever arm is caused to pivot by the pulling means.

8. The belt pulling and clamping apparatus of claim 7 wherein a piston is mounted in the frame for vertical movement and for pushing against one of said clamping members, and an arcuate surface engagement between the piston and the second portion of the lever.

9. The belt pulling and clamping apparatus of claim 7 including an anvil surface fixed on the frame between the vertical guiding surfaces thereon for supporting the other of the clamping members.

10. The belt pulling and clamping apparatus of claim 7 wherein the vertical guiding surfaces comprise two pairs of opposing vertical guiding surfaces with one of the pairs of opposing vertical guiding surfaces being spaced apart by a first width and the other of the pairs of opposing vertical guiding surfaces being spaced apart by a second width different from the first width to form abutment shoulders between the pairs of opposing vertical guide surfaces.

11. The belt pulling and clamping apparatus of claim 10 wherein the one pair of vertical guiding surfaces is adjacent the one of the first and second clamping members and the other pair of vertical guiding surfaces is adjacent the other of the first and second clamping members with the abutment shoulders limiting sliding vertical movement of the other of the first and second clamping members along the other pair of opposing vertical guide surfaces adjacent thereto.

12. A belt clamping mechanism for use with a pair of clamping members for clamping and pulling a belt portion, the belt clamping mechanism comprising:

a frame;

first and second clamping members to clamp opposite sides of the belt;

a pulling means;

at least one clamping lever pivotally connected to said pulling means;

the clamping lever being pivotable from a release position in which the clamping lever does not exert a force on one of the first and second clamping members to clamp a belt portion between the clamping members, and a clamping position in which the clamping lever exerts a force on the one of the first and second clamping members to clamp the belt portion between the first and second clamping members upon pulling on the pulling means; and a vertical guiding means adjacent respective front and rear sides of the clamping members to limit twisting and rotation of the clamping members as the pulling means is pulled.

13. The belt clamping mechanism in accordance with claim 12 in which the vertical guiding means comprises a frame with a central opening and the vertical guiding surfaces of the vertical guiding means comprise forward and rearward, oppositely facing guiding wall surfaces on the frame at the opening for being disposed adjacent respective forward and rearward surfaces of the clamping members.

14. The belt clamping mechanism in accordance with claim 12 in which the belt clamping mechanism has pre-tightening means for manually adjusting the distance between the clamping members to clamp the belt portion between the clamping members at a pretightened position prior to said pulling on the pulling means to reduce slippage of the belt portion with respect to the clamping members upon initial pulling of the pulling means.

15. The belt clamping mechanism in accordance with claim 14 in which the pretightening means comprises a threaded member in threaded engagement with the frame and engageable with the clamping lever.

16. The belt clamping mechanism in accordance with claim 12 wherein the clamping lever has an arcuate surface on a portion thereof which abuts the one of the first and second clamping members as the pulling means is pulled to the clamping position.

17. The belt clamping mechanism in accordance with claim 12 wherein the vertical guiding means comprises a vertical guiding member including vertical guiding surfaces adjacent respective front and rear sides of the clamping members for guiding the clamping members for vertical movement.

18. A vertical guide frame for use in a belt clamping jaw having a pair of clamping members for clamping a belt and in which one of the clamping members has a predetermined vertical height and has a flat vertical forward surface and a flat vertical rear surface spaced a predetermined distance apart, the vertical guiding frame comprising:

an integral frame having an aperture therethrough for receiving at least one of said clamping members;

a forward vertical surface and an opposing rear vertical surface on the frame defining a portion of the aperture in the frame;

the forward and rear vertical surfaces of the aperture having a distance therebetween substantially corresponding to the predetermined distance between the forward and rear vertical surfaces of said clamping member so that the vertical surfaces of the clamping member reside directly adjacent respective forward and rear vertical surfaces defined by the aperture; and the vertical surfaces having a vertical height greater than said predetermined height of the clamping member to allow vertical movement of the clamping member within the aperture, with the vertical guiding surfaces of the frame being positioned closely adjacent respective vertical forward and rear surfaces of the clamping members to limit twisting and rotation of the clamping member during vertical movement of the clamping member.

19. A vertical guide member in accordance with claim 18 in which the second clamping member has a pair of forward and rear surfaces with a distance therebetween greater than the distance between the pair of forward and rear surfaces of the first clamping member, and the frame includes an upper pair of opposing forward and rear vertical surfaces and a lower pair of opposing vertical forward and rear surfaces defining the aperture, with the distance between the lower pair of opposing vertical surfaces of the frame corresponding to the distance between the forward and rear surfaces of the second clamping member and being greater than the distance between the upper pair of opposing vertical surfaces.

20. The vertical guide member of claim 19 wherein the second clamping member has a predetermined vertical height and the lower pair of opposing vertical forward and rear surfaces each have a vertical height substantially the same as the predetermined height of the second clamping member with abutment shoulders formed between the upper and lower pair of opposing vertical forward and rear surfaces to substantially limit vertical movement of the second clamping member within the aperture.

21. The vertical guide member of claim 19 wherein the second clamping member has a central horizontal web extending between the forward and rear surfaces thereof and the frame includes a horizontal anvil surface between the lower pair of opposing vertical forward and rear surfaces to support the horizontal web thereon.

22. A belt clamping mechanism comprising:

a frame defining an opening therein;

first and second clamping members received in the opening for clamping a belt end therebetween;

a piston guided and supported for vertical movement relative to the frame;

a clamping lever pivotally mounted on the frame for exerting a force on the piston to vertically move the piston into engagement with at least one of the first and second clamping members to clamp a belt end therebetween;

an anvil surface on the frame for supporting the other of the first and second clamping members; and pulling means for exerting a force on the clamping lever pivoting the clamping lever to exert a force on the piston and cause the first and second clamping members to tightly grip a belt end therebetween.

23. The belt clamping mechanism of claim 22 wherein the frame includes substantially vertical surfaces bounding the opening with the vertical surfaces capable of guiding sliding vertical movement of the one clamping member as the clamping lever is pivoted to exert a force on the piston and the one clamping member, the vertical surfaces limiting twisting and rotation of the clamping members under high load forces from the pulling means.

24. The belt clamping mechanism of claim 22 including pretightening means for adjusting the distance between the clamping members to clamp the belt end between the clamping members at a pretightened position prior to exerting a force on the clamping lever with the pulling means to reduce slippage of the belt end with respect to the clamping members upon initial exertion of a force on the clamping lever with the pulling means.

25. The belt clamping mechanism of claim 22 wherein the clamping lever comprises an L-shaped lever arm pivotally mounted to the frame having a first portion of a first length pivotally connected to the pulling means and a second portion having a length substantially shorter than said first length and extending in the frame to drive the piston and the one clamping member towards the other clamping member to clamp the belt therebetween as the lever arm is caused to pivot by the pulling means.

* * * * *